US007706698B2

(12) United States Patent
Kajikuri

(10) Patent No.: US 7,706,698 B2
(45) Date of Patent: Apr. 27, 2010

(54) REMOTE CONTROL SYSTEM AND RECEIVER

(75) Inventor: Junichi Kajikuri, Kanagawa (JP)

(73) Assignee: Sony Corporation (JP)

( * ) Notice: Subject to any disclaimer, the term of this patent is extended or adjusted under 35 U.S.C. 154(b) by 1158 days.

(21) Appl. No.: 11/312,096

(22) Filed: Dec. 20, 2005

(65) Prior Publication Data

US 2006/0158346 A1 Jul. 20, 2006

(30) Foreign Application Priority Data

Dec. 21, 2004 (JP) ............................ 2004-368621

(51) Int. Cl.
*H04B 10/06* (2006.01)

(52) U.S. Cl. ........................ 398/212; 398/202; 385/92; 385/93

(58) Field of Classification Search ................ 345/156, 345/168, 169, 179, 180, 181, 182, 183; 356/614, 356/615; 340/825.71, 825.72; 348/744; 353/71
See application file for complete search history.

(56) References Cited

U.S. PATENT DOCUMENTS

| | | | | |
|---|---|---|---|---|
| 4,393,515 | A | 7/1983 | de Neumann et al. | |
| 5,914,783 | A * | 6/1999 | Barrus | 356/614 |
| 6,064,502 | A | 5/2000 | Burns et al. | |
| 6,256,129 | B1 | 7/2001 | Kim et al. | |
| 6,424,442 | B1 | 7/2002 | Gfeller et al. | |
| 6,879,784 | B1 | 4/2005 | Blair et al. | |
| 6,887,196 | B2 | 5/2005 | Arai et al. | |
| 6,967,754 | B2 | 11/2005 | Bratt et al. | |
| 6,996,651 | B2 * | 2/2006 | Garinger et al. | 710/305 |
| 7,116,910 | B1 | 10/2006 | Presby et al. | |
| 7,180,510 | B2 * | 2/2007 | Inoue et al. | 345/180 |
| 2004/0041786 | A1 * | 3/2004 | Inoue et al. | 345/156 |
| 2006/0140265 | A1 * | 6/2006 | Igler et al. | 375/240.01 |

FOREIGN PATENT DOCUMENTS

| | | | |
|---|---|---|---|
| JP | 04-096378 | A | 3/1992 |
| JP | 04-360109 | A | 12/1992 |
| JP | 05-175910 | A | 7/1993 |
| JP | 05-175911 | A | 7/1993 |
| JP | 6269069 | | 9/1994 |
| JP | 06-289260 | A | 10/1994 |
| JP | 2000101910 | | 4/2000 |
| JP | 2000235440 | | 8/2000 |
| JP | 2001-125680 | A | 5/2001 |
| JP | 2001282424 | | 10/2001 |
| JP | 2002006820 | | 1/2002 |
| JP | 2002-064883 | A | 2/2002 |

* cited by examiner

*Primary Examiner*—My-Chau T Tran
(74) *Attorney, Agent, or Firm*—Lerner, David, Littenberg, Krumholz & Mentlik, LLP

(57) ABSTRACT

When operation keys are operated, a light-emitting device outputs an infrared signal corresponding to the operated operation keys. The infrared signal is applied to a light-detecting device. In response to the applied infrared signal, the light-detecting device generates a detected signal and supplies the detected signal to an amplifying circuit. The amplified detected signal from the amplifying circuit is decoded by a decoding circuit into a data code, which is supplied through an interface circuit to a computer. Based on control data supplied as the data code to the computer, the computer controls a projector to perform a process of displaying images page by page, for example.

7 Claims, 9 Drawing Sheets

[APEX ANGLE IS 70°]

REMOTE CONTROL SYSTEM AND RECEIVER

CROSS-REFERENCE TO RELATED APPLICATIONS

The present application claims priority from Japanese Patent Application No. JP 2004-368621 filed on Dec. 21, 2004, the disclosure of which is hereby incorporated by reference herein.

BACKGROUND OF THE INVENTION

The present invention relates to a remote control system and a receiver for controlling an electronic device connected to a computer with a wireless signal such as an infrared signal or the like.

There has been proposed a remote control system having a projector for displaying an image on a screen based on a video signal supplied from a personal computer and a remote control unit for remotely controlling the projector. For details, reference should be made to Japanese Patent laid-open No. 2002-64883.

The remote control system includes receiving means for receiving a control signal transmitted from the remote control unit and control means for controlling operation of the projector based on the received control signal, the receiving means and the control means being mounted on the projector.

The remote control system needs to have dedicated units, including the receiving means and the control means, on the projector. Therefore, the remote control system is not versatile in that it fails to remotely control projectors which do not have the receiving means and the control means.

In addition, the projector with the receiving means and the control means are relatively costly to manufacture.

SUMMARY OF THE INVENTION

The present invention has been made in view of the above circumstances and provides a remote control system and a receiver which are highly versatile and are capable of remotely controlling an electronic device such as a projector inexpensively without the need for dedicated units on the electronic device.

In order to attain the desire described above, there is provided in accordance with the present invention, a remote control system including a transmitter including input means having operation members for generating control data depending on operation of the operation members, encoding means for encoding the control data into a data code, and a transmitting means for transmitting a wireless signal corresponding to the data code, and a receiver including receiving means for receiving the wireless signal and generating a detected signal, decoding means for decoding the data code modulated based on the detected code into the control data, and interface means connected to a computer for outputting the control data to the computer, wherein the computer is connected to an electronic device that operates based on data supplied from the computer, and the computer supplies the data to the electronic device based on the control data supplied from the interface means.

According to the present invention, there is also provided a receiver including receiving means for receiving a wireless signal generated based on a data code converted from control data and generating a detected signal, decoding means for decoding the data code modulated based on the detected code into the control data, and interface means connected to a computer for outputting the control data to the computer, wherein the computer is connected to an electronic device that operates based on data supplied from the computer, and the computer supplies the data to the electronic device based on the control data supplied from the interface means.

With the remote control system according to the present invention, the transmitter is operated to transmit a wireless signal to the receiver to supply control data to the computer, thereby supplying data to the electronic device connected to the computer to remotely control the electronic device.

With the receiver according to the present invention, when a wireless signal is received, control data is supplied to the computer, thereby supplying data to the electronic device connected to the computer to remotely control the electronic device.

Since no dedicated units need to be incorporated in the electronic device for remotely controlling the electronic device, the remote control system is highly versatile and is effective to reduce costs required for remotely controlling the electronic device.

The above desire is achieved by the remote control system according to the present invention because the transmitter transmits a wireless signal to the receiver and the computer supplies data to the electronic device based on control data supplied from the interface means of the receiver.

The above desire is also achieved by the receiver according to the present invention because the computer supplies data to the electronic device based on control data supplied from the interface means of the receiver.

The above and other objects, features, and advantages of the present invention will become apparent from the following description when taken in conjunction with the accompanying drawings which illustrate a preferred embodiment of the present invention by way of example.

DETAILED DESCRIPTION

Figure 1:
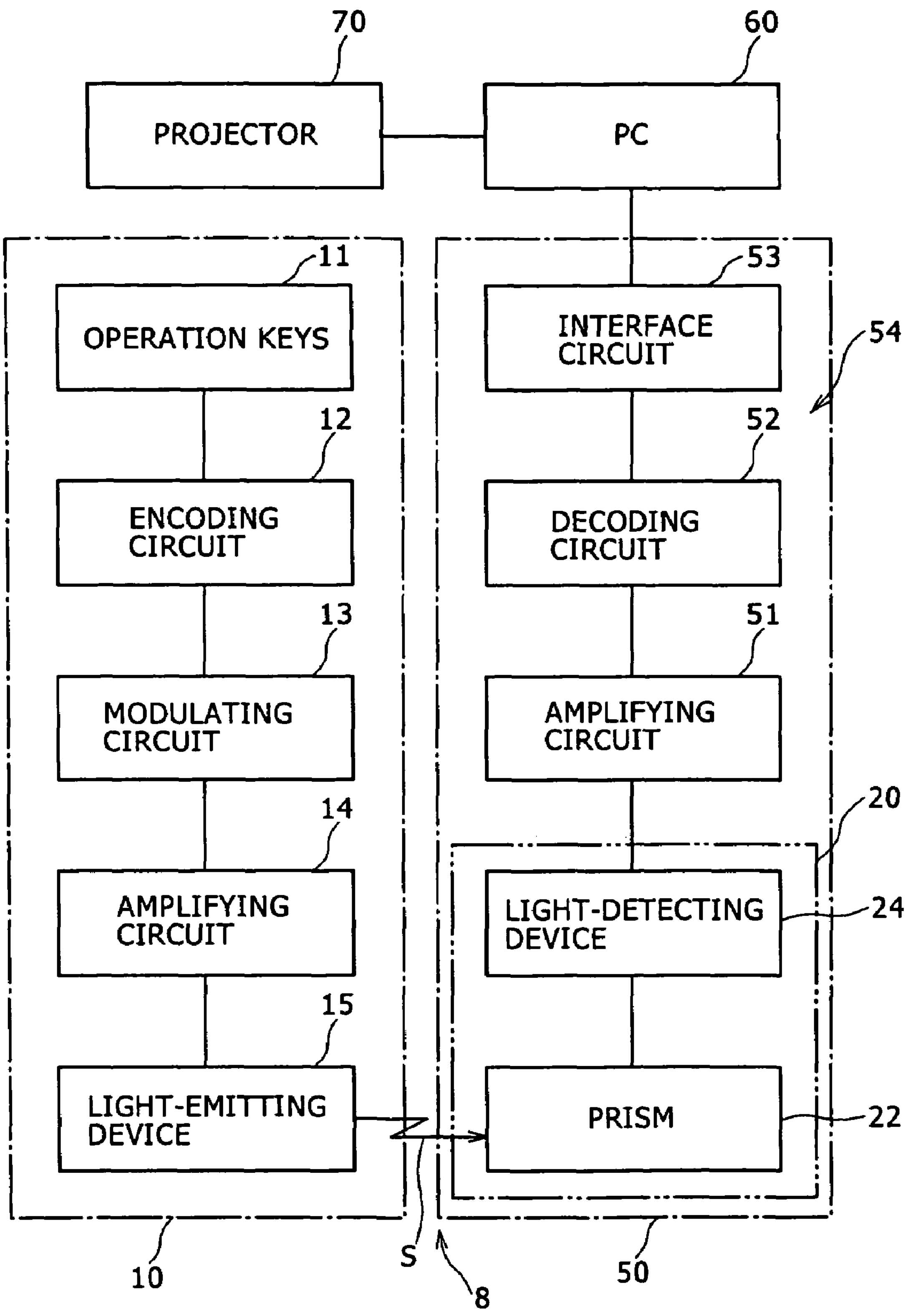
FIG. 1 is a block diagram of an infrared remote controller including an infrared transmitter and an infrared receiver.
Figures 2A, 2B, 2C:
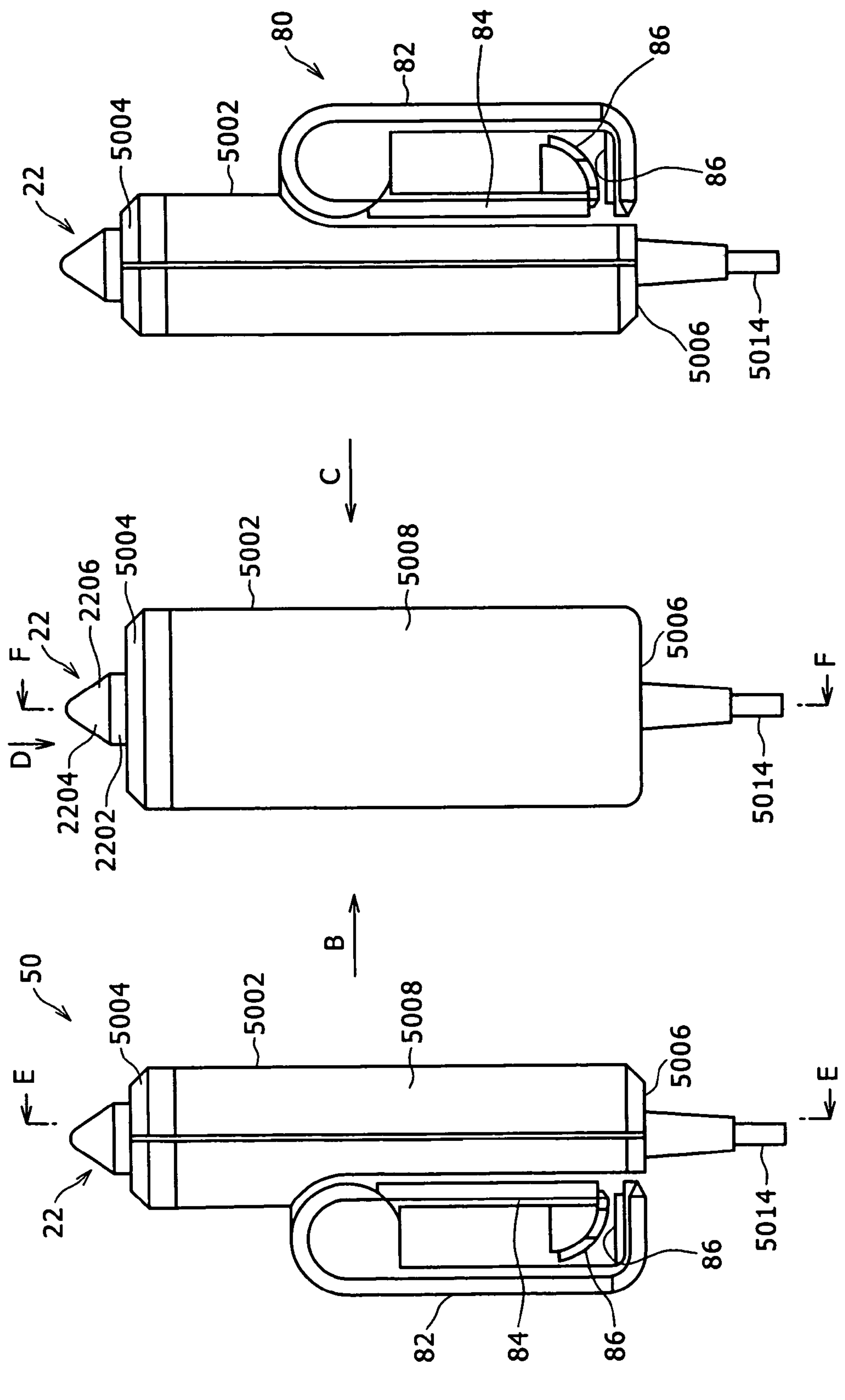
FIG. 2A is a plan view of the infrared receiver.
FIG. 2B is a view taken in the direction indicated by the arrow B in FIG. 2A.
FIG. 2C is a view taken in the direction indicated by the arrow C in FIG. 2A.
Figure 3D:
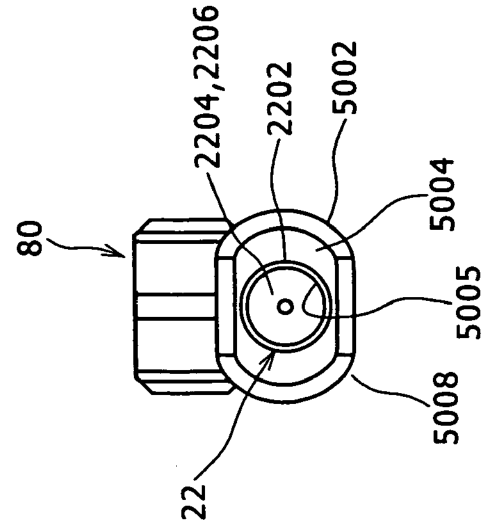
FIG. 3D is a view taken in the direction indicated by the arrow D in FIG. 2A.
Figure 3F:
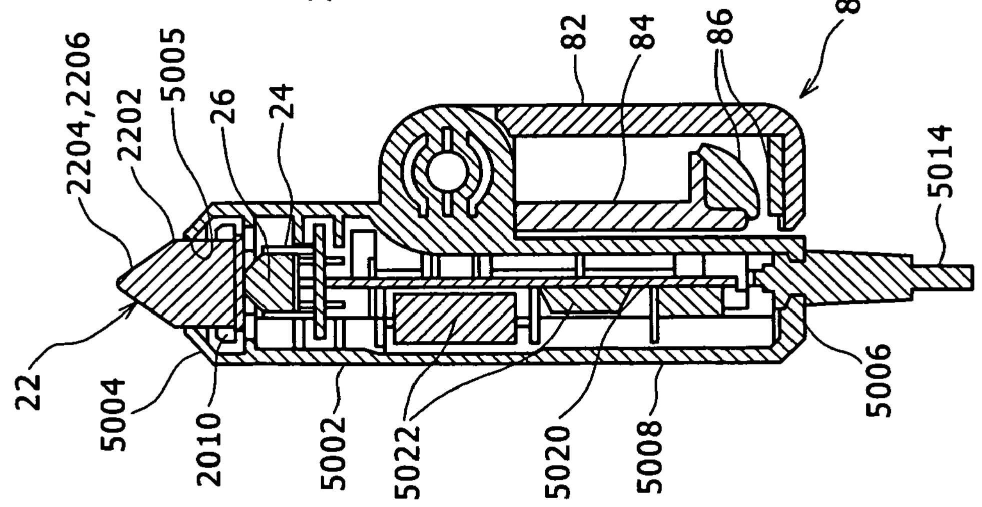
FIG. 3F is a cross-sectional view taken along line F-F of FIG. 2A.
Figure 3E:
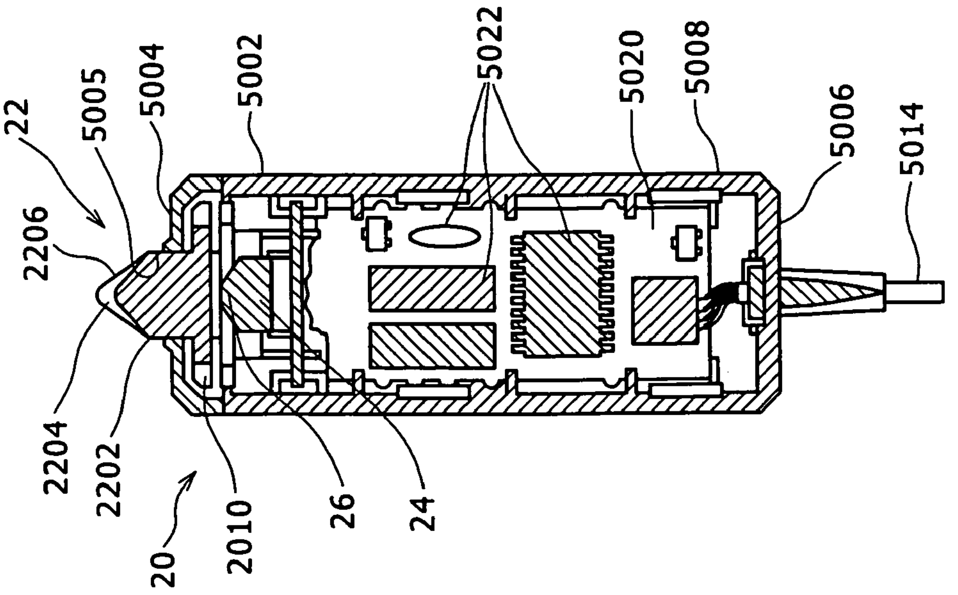
FIG. 3E is a cross-sectional view taken along line E-E of FIG. 2B.

As shown in FIG. 1, an infrared remote controller 8 includes an infrared transmitter 10 and an infrared receiver

50. The infrared remote controller 8 serves as a remote control system according to the present invention. The infrared transmitter 10 serves as a transmitter according to the present invention. The infrared receiver 50 serves as a receiver according to the present invention.

The infrared receiver 50 is connected to a computer 60 through a general-purpose interface such as a USB (Universal Serial Bus), which is incorporated as a standard interface in many computers, for communication with the computer 60.

Figure 5:
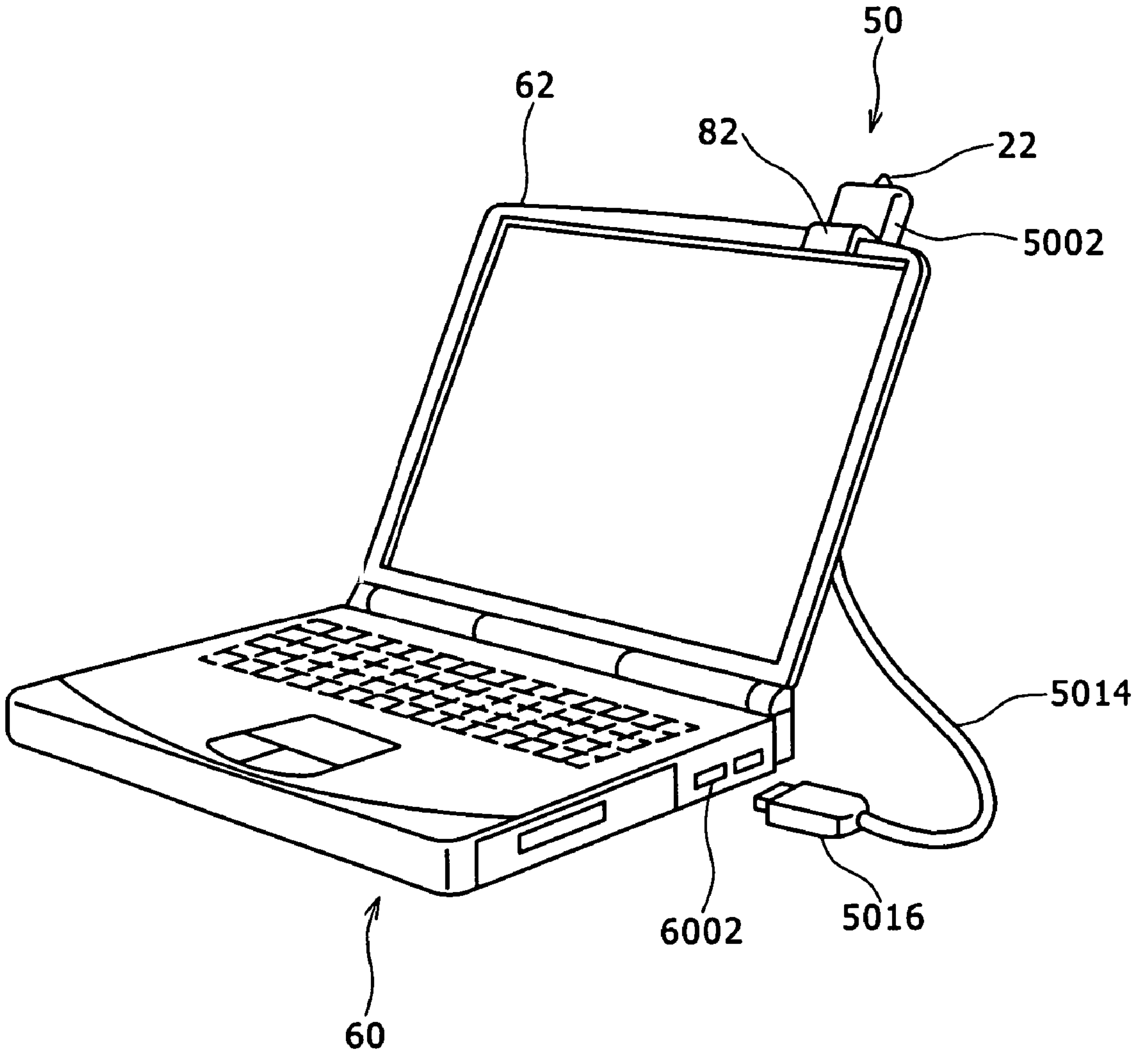
FIG. 5 is a perspective view of a personal computer with the infrared receiver mounted thereon.

The computer 60 has a display panel 62 (see FIG. 5). When the computer 60 operates based on an application program installed therein, it displays characters and images including still and moving images on the display panel 62.

The computer 60 is connected to a projector 70 which displays images on a screen, not shown. When the computer 60 executes an application program installed therein, it supplies the projector 70 with a video signal for displaying images.

The application program enables the computer 60 to control the projector 70 to display images on the screen one by one in a slide show mode.

When certain keys of the keyboard of the computer 60 are operated, the computer 60 performs a process of displaying images page by page (page scrolling), a process of displaying a uniformly black image on the screen (blackout), and a process of displaying a uniformly white image on the screen (whiteout).

When the computer 60 is supplied with control data equivalent to the operation of the above certain keys, the computer 60 can also performs the page scrolling process, the blackout display process, and the whiteout display process as described above.

The projector 70 includes a liquid-crystal display device for forming an image based on the video signal supplied from the computer 60, a light source for emitting light to the liquid-crystal display device, which emits light modulated by the image formed thereby, and an optical system for focusing the light emitted by the liquid-crystal display device onto the screen.

The infrared transmitter 10 includes a plurality of operation keys 11, an encoding circuit 12, a modulating circuit 13, an amplifying circuit 14, and a light-emitting device 15.

The operation keys 11 are assigned to operation commands to be given to the computer 60, and generate control data when they are operated.

The encoding circuit 12 generates a data code represented as binary data (expressed by a combination of 0s and 1s) depending on the control data supplied from the operation keys 11.

The modulating circuit 13 modulates a carrier signal with the data code.

The amplifying circuit 14 amplifies a modulated signal from the modulating circuit 13 and outputs the amplified signal as a drive signal.

The light-emitting device 15 outputs a wireless infrared signal S as a light beam based on the drive signal supplied from the amplifying circuit 14.

The operation keys 11 serve as an operating member as claimed, the encoding circuit 15 as an encoding unit as claimed, and the modulating circuit 13, the amplifying circuit 14, and the light-emitting device 15 as a transmitting unit as claimed.

The infrared receiver 50 has an omnidirectional photodetector 20 and a signal processor 54.

The omnidirectional photodetector 20 serves to detect the infrared signal S output as a light beam from the light-detecting device 15, and output a detected signal.

The signal processor 54 includes an amplifying circuit 51, a decoding circuit 52, and an interface circuit 53.

The amplifying circuit 51 amplifies the detected signal output from the omnidirectional photodetector 20.

The decoding circuit 52 demodulates the amplified detected signal from the amplifying circuit 51 back into the data code, decodes the data code, and outputs the decoded data code as the control data.

The interface circuit 53 converts the control data supplied from the decoding circuit 52 into USB data, and supplies the USB data to the personal computer 60.

The control data represents control data that can be processed by the computer 60. According to the present embodiment, the control data enables the computer 60 to perform the page scrolling process, the blackout display process, and the whiteout display process.

The omnidirectional photodetector 20 serves as a receiving unit as claimed, the amplifying circuit 51 and the decoding circuit 52 as a decoding unit as claimed, and the interface circuit 53 as an interface unit as claimed.

As shown in FIGS. 2A through 2C and 3D through 3F, the infrared receiver 50 includes a casing 5002 having a vertical height, a horizontal width smaller than the vertical height, and a thickness or depth smaller than the horizontal width.

The casing 5002 has an upper end wall 5004 disposed on an upper end thereof, a lower end wall 5006 disposed on a lower end thereof, and a side wall 5008 interconnecting peripheral edges of the upper end wall 5004 and the lower end wall 5006.

The omnidirectional photodetector 20 is disposed in an upper portion of the casing 5002. The omnidirectional photodetector 20 has a prism 22 and a light-detecting device 24.

The prism 22 includes a cylindrical columnar body 2202 and a conical member 2204 disposed on an upper end of the columnar body 2202 and having a cross-sectional area that is progressively smaller toward the tip end of the conical member 2204. According to the present embodiment, the prism 22 is made of a light-transmissive synthetic resin such as acrylic resin, for example.

The prism 22 may be made of any of various other light-transmissive materials such as glass.

The columnar body 2202 has a lower portion inserted in an opening 5005 defined in the upper end wall 5004 of the casing 5002. With the columnar body 2202 thus positioned, the conical member 2204 is located above the columnar body 2202 and has its axis extending vertically, and the conical member 2204 is exposed in its entirety and the columnar body 2202 is exposed partly.

The conical member 2204 has a conical surface 2206 as its outer circumferential surface providing a reflecting surface for reflecting a light beam applied from an external source to the conical surface 2206 into the columnar body 2202 and downwardly toward the lower end of the columnar body 2202.

In the present embodiment, the columnar body 2202 has a diameter of 9 mm, and the conical member 2204 has an apex angle of about 70 degrees. The conical member 2204 has a round tip end having a radius of about 1 mm. If the radius of the round tip end is too large, then it is difficult for the conical surface 2206 to have a required surface area. If the radius of the round tip end is too small, then it is difficult to shape the columnar body 2202 as desired. For these reasons, the radius of the round tip end should preferably be about 1 mm. Since the round tip end of the conical member 2204 is resistant to damage, it is effective to prevent the conical member 2204 from being damaged.

The prism 22 also has a rectangular plate 2010 disposed on the lower end of the columnar body 2202 remote from the conical member 2204. The rectangular plate 2010 extends in a direction perpendicularly to the axis of the conical member 2204 and has a profile, as viewed in plan, greater than the profile of the columnar body 2202.

The light-detecting device 24 is disposed beneath the lower end of the columnar body 2202, i.e., in the upper portion of the casing 5002 in axial alignment with the conical member 2204. The light-detecting device 24 detects the light beam applied to the conical surface 2206 and guided through the columnar body 2202 to the light-detecting device 24, generates a detected signal based on the detected light beam, and supplies the detected signal to the amplifying circuit 51.

A condenser lens 26 for converging the light beam emitted from the plate 2010 on the lower end of the columnar body 2202 onto the light-detecting device 24 is disposed between the plate 2010 and the light-detecting device 24. In the present embodiment, the condenser lens 26 is integrally combined with the light-detecting device 24.

The casing 5002 also houses therein an elongate rectangular printed-circuit board 5020 with its longer sides oriented vertically and its shorter sides horizontally.

On the printed-circuit board 5020, there are mounted electronic components 5022 including ICs, capacitors, quartz crystal oscillators, etc. which make up the amplifying circuit 51, the decoding circuit 52, and the interface circuit 53.

A connecting cable 5014 has an end connected to a lower portion of the printed-circuit board 5020, and extends out of the casing 5002 through an opening defined the lower end wall 5006 of the casing 5002. As shown in FIG. 5, a USB plug 5016 is connected to the other end of the connecting cable 5014 for connection to a USB connector 6002 of the personal computer 60.

Figure 4:
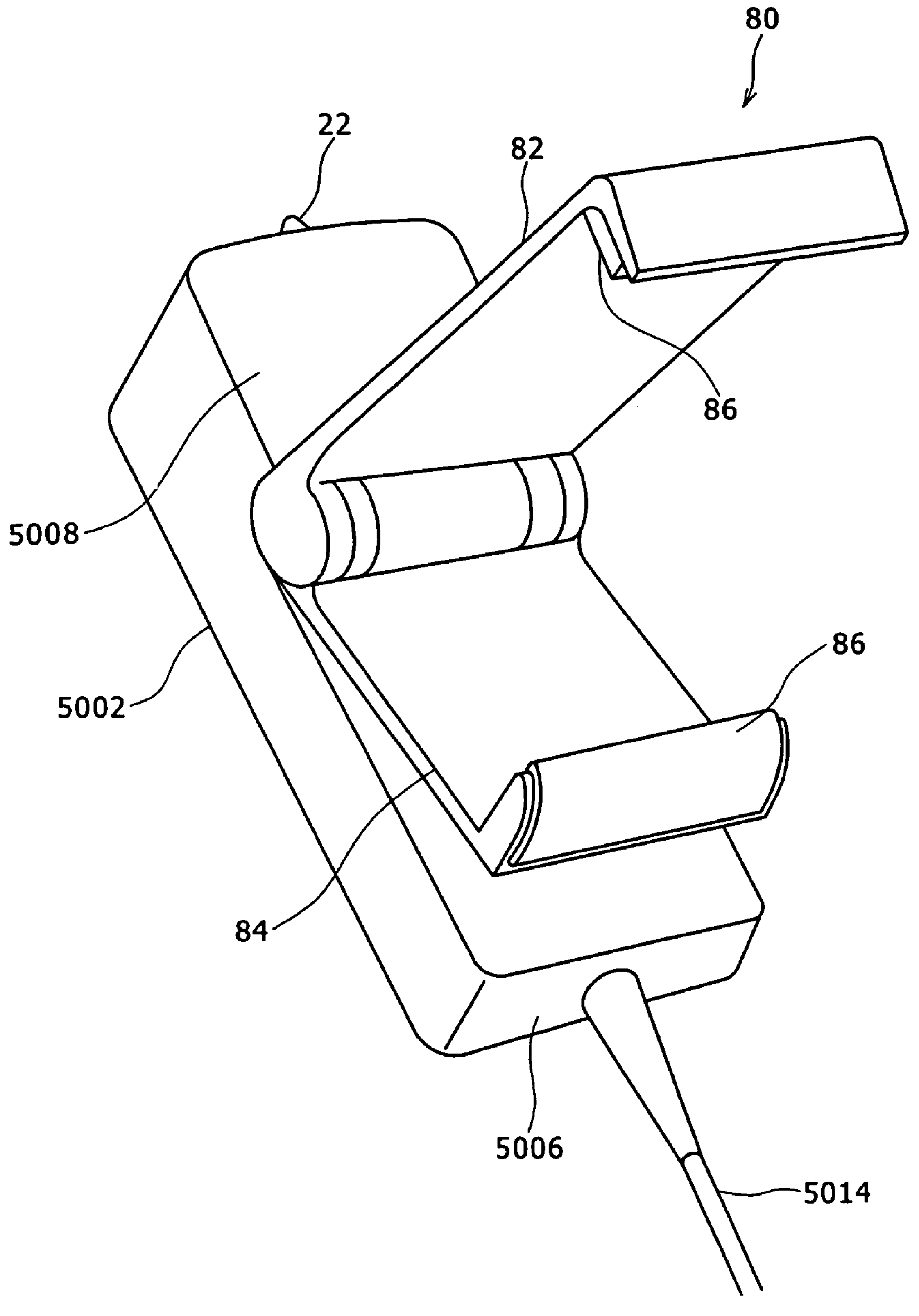
FIG. 4 is a perspective view of the infrared receiver.
Figure 6:
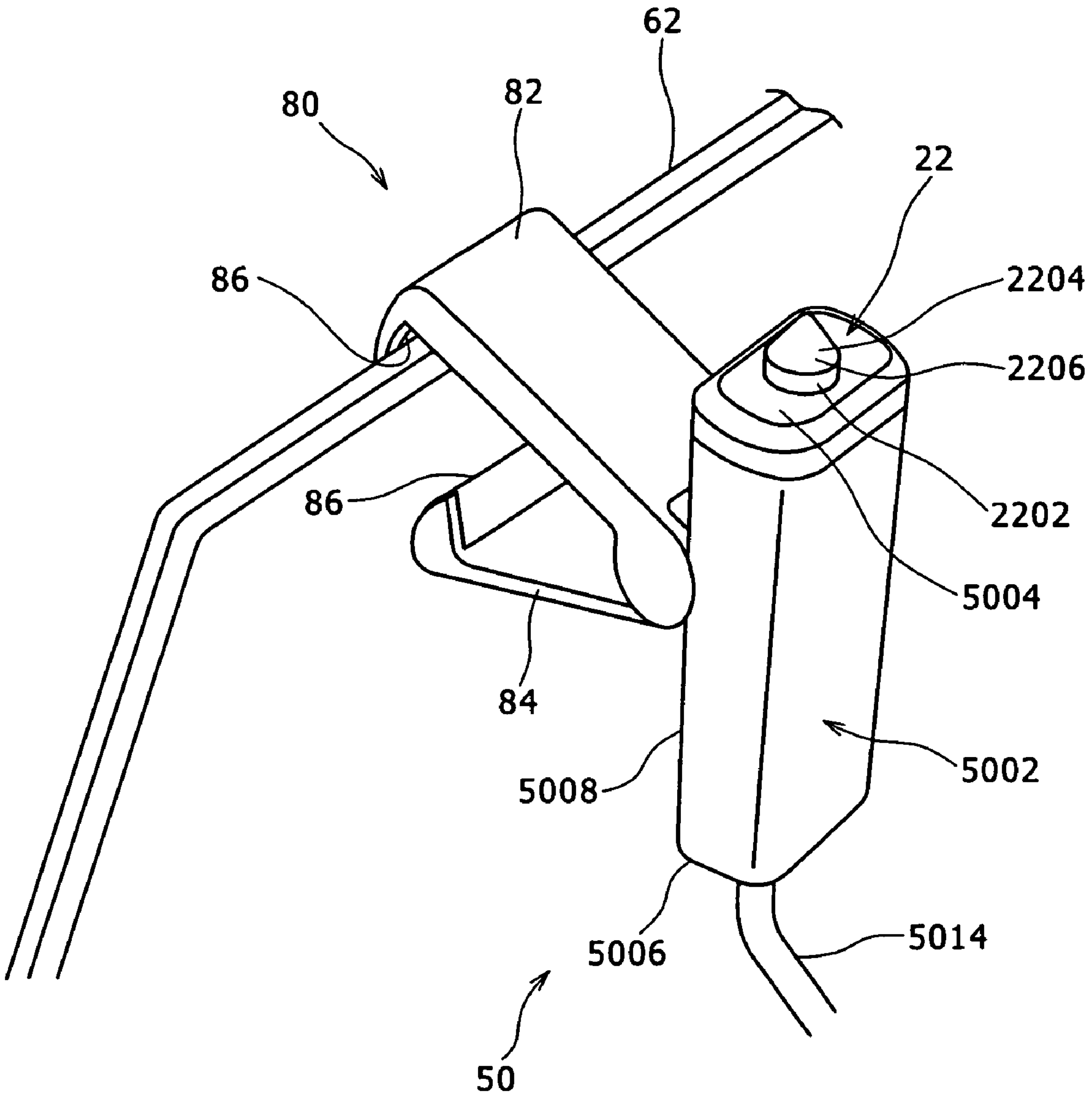
FIG. 6 is an enlarged fragmentary perspective view of the infrared receiver mounted on the personal computer shown in FIG. 5.
Figure 7A:
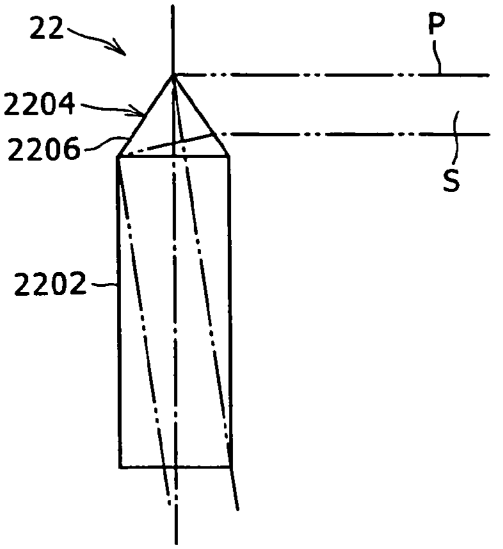
FIGS. 7A through 7D are views illustrative of the manner in which light beams are applied to a prism.
Figure 7C:
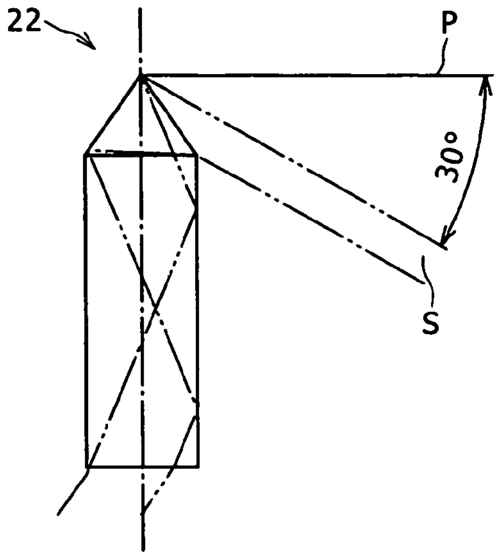
Figure 7B:
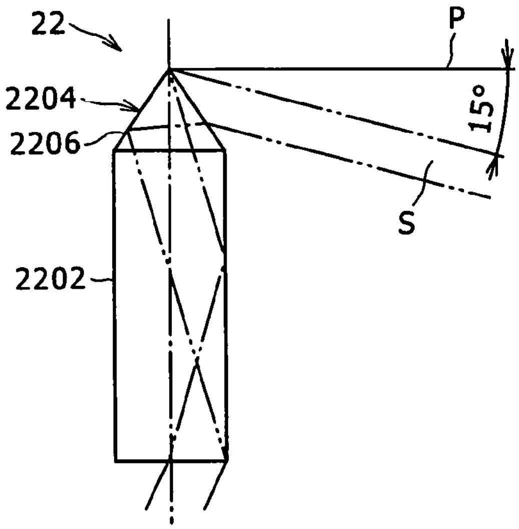
Figure 7D:
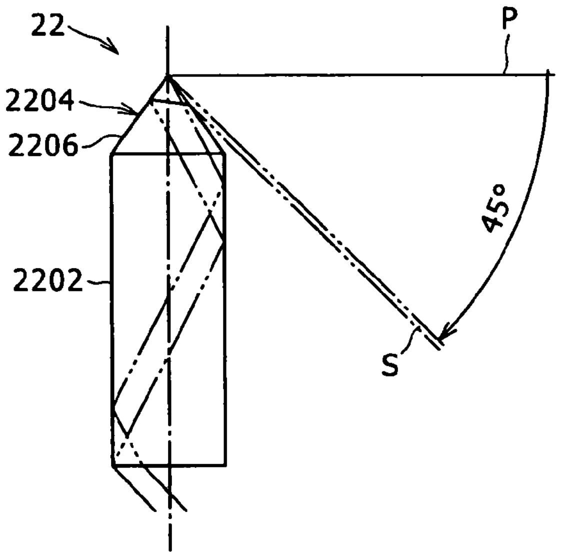
Figure 8A:
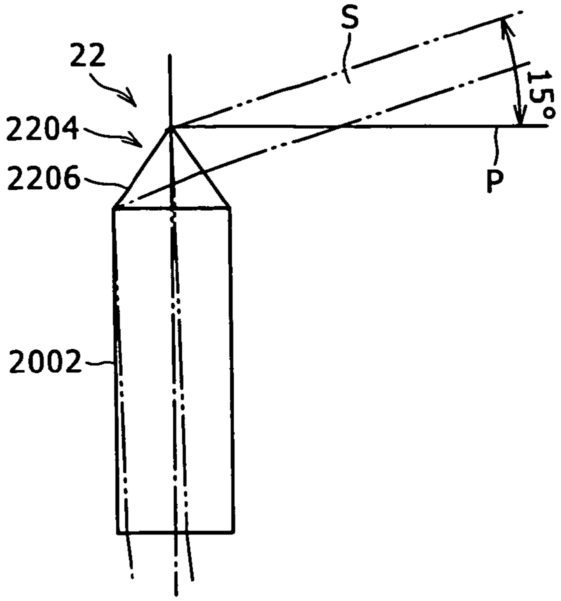
FIGS. 8A through 8D are views illustrative of the manner in which light beams are applied to the prism.
Figure 8C:
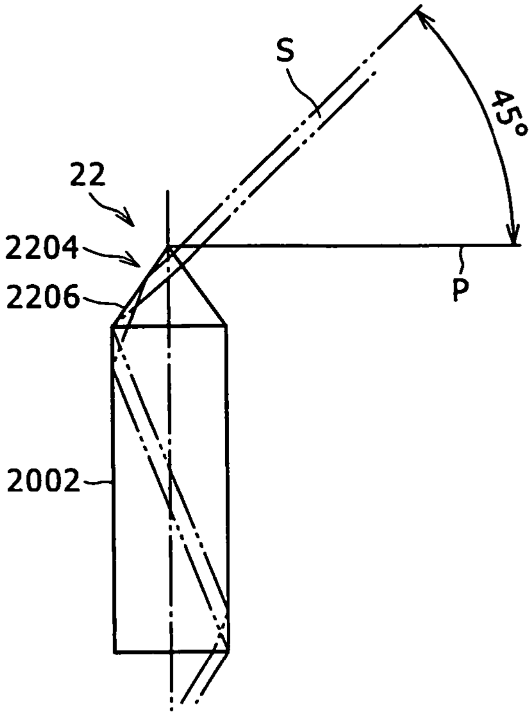
Figure 8B:
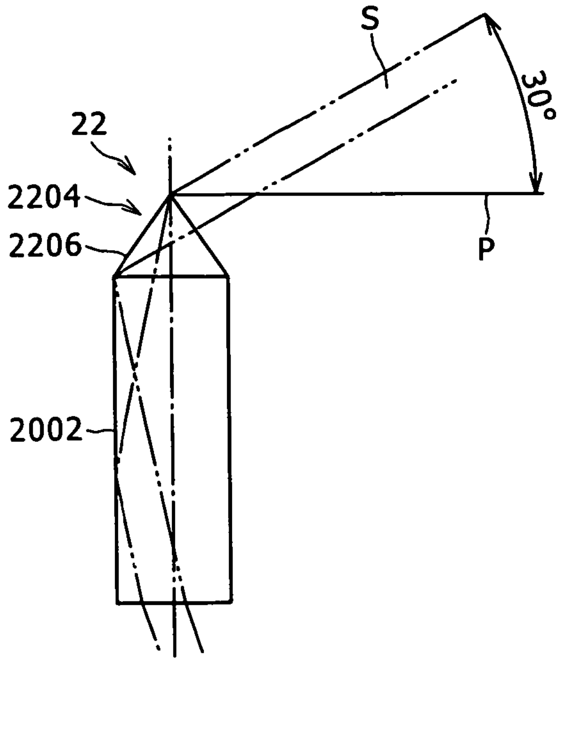
Figure 8D:
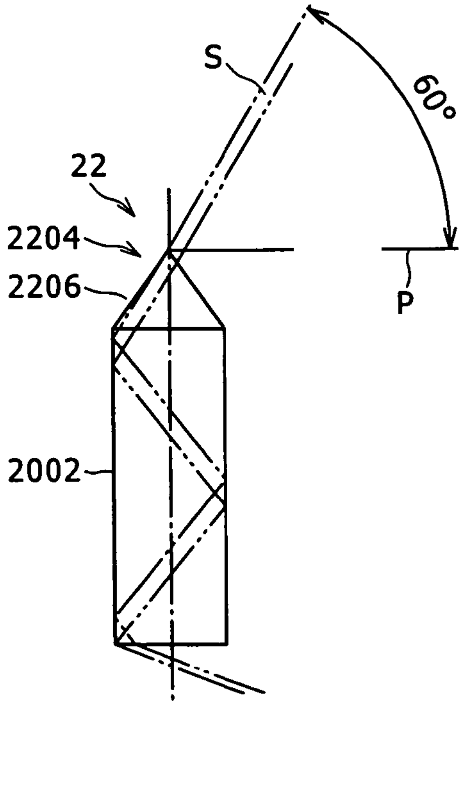

As shown in FIGS. 4, 5, and 6, an attachment 80 is disposed on the side wall 5008 of the casing 5002 for removably mounting the infrared receiver 50 on a thin-walled portion, such as the display panel 62 or the like, of the personal computer 60.

The attachment 80 has a first arm 82 and a second arm 84 that are pivotally coupled to the casing 5002 so as to be angularly movable toward and away from each other, and a biasing member (not shown) for normally biasing the first arm 82 and the second arm 84 to move toward each other.

Grip layers 86 made of a material having a large coefficient of friction, such as rubber of the like, are mounted on respective distal ends of the first arm 82 and the second arm 84.

Next, the characteristic of the conical member 2204 is explained as follows:

FIGS. 7A, 7B, 7C, and 7D show paths of light beams in the prism 22 when the angles θ formed between the light beams representing the infrared signal S emitted from the infrared transmitter 10 to the conical member 2204 and a hypothetical plane P lying perpendicularly to the axis of the conical member 2204 are 0, 15, 30, and 45 degrees, respectively, downwardly of or clockwise from the hypothetical plane P.

FIGS. 8A, 8B, 8C, and 8D show paths of light beams in the prism 22 when the angles θ formed between the light beams representing the infrared signal S emitted from the infrared transmitter 10 to the conical member 2204 and the hypothetical plane P lying perpendicularly to the axis of the conical member 2204 are 15, 30, 45, and 60 degrees, respectively, upwardly of or counterclockwise from the hypothetical plane P.

It is assumed that the angle θ between the light beam representing the infrared signal S and the hypothetical plane P is positive if the light beam is tilted downwardly as it approaches the prism 22, and negative if the light beam is tilted upwardly as it approaches the prism 22.

As shown in FIGS. 7A through 7D and FIGS. 8A through 8D, the light beam reflected by the conical surface 2206 into the columnar body 2202 is guided by the columnar body 2202 toward the lower end thereof, from which the light beam is emitted downwardly.

The light beam that is emitted from the lower end of the columnar body 2202 spreads differently depending on the angle θ between the light beam and the hypothetical plane P.

Measurements made by the inventor have indicated that the light beam emitted from the lower end of the columnar body 2202 spreads minimally when the angle θ is 0 and 90 degrees, and spreads progressively greater as the angle θ increases from 0 degree to 90 degrees.

Figure 9:
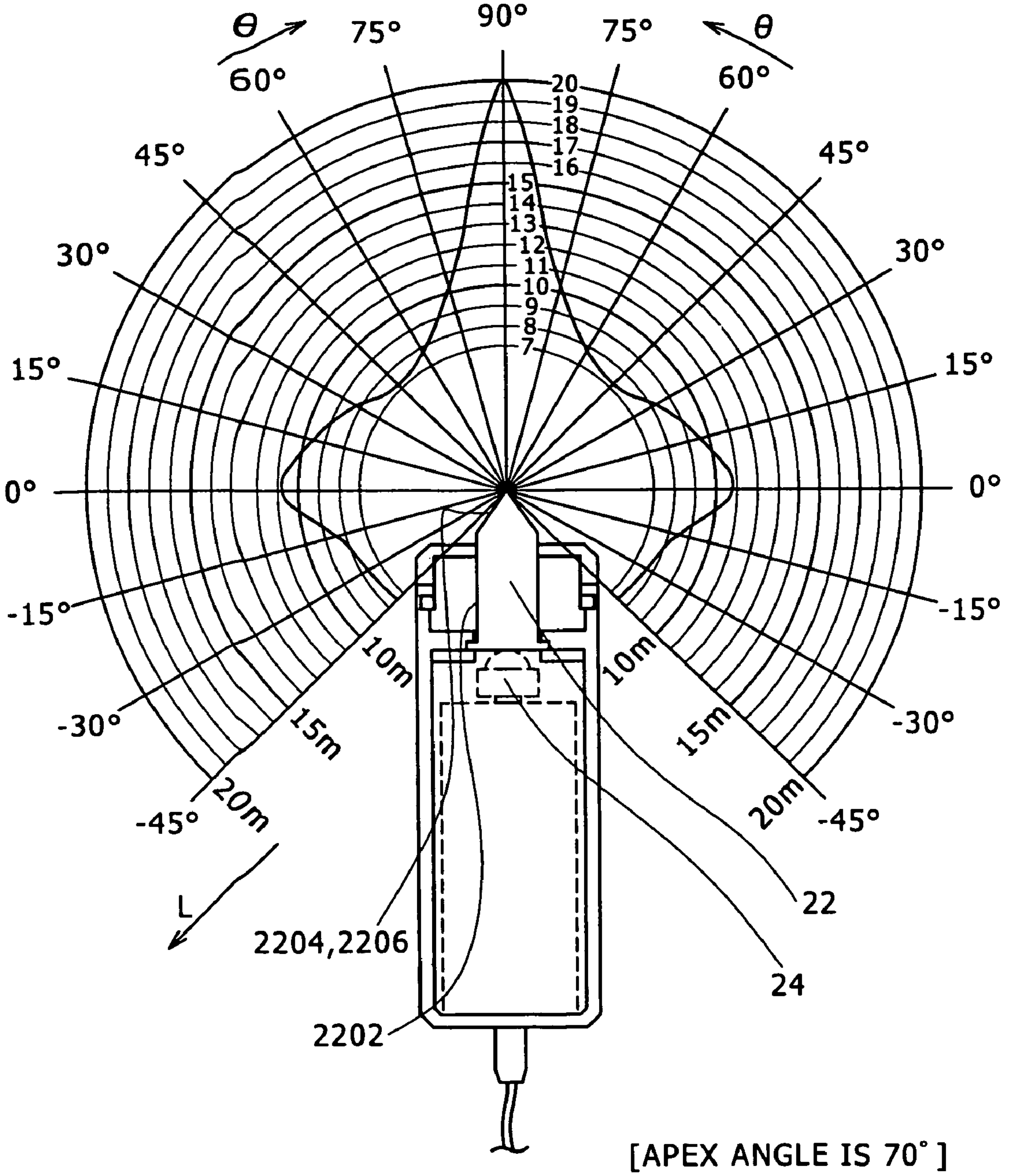
FIG. 9 is a diagram showing measured values of the communicatable range of the infrared detector.

FIG. 9 is a diagram showing the relationship between the angle θ between the light beam and the hypothetical plane P and a communicatable range L when the apex angle of the conical member 2204 is 70 degrees.

The communicatable range L represents a distance between the omnidirectional photodetector 20 and the infrared transmitter 10, which allows the level of a signal detected by the light-detecting device 24 to have a minimum level that can be processed by the signal processor 54.

Regardless of the angle θ between the light beam and the hypothetical plane P, the communicatable range L should preferably be as large as possible to provide a wide range in which the infrared transmitter 10 can be used.

As shown in FIG. 9, the communicatable range L is of local maximum values when the angle θ is 0 and 90 degrees, and is progressively smaller as the angle θ increases from 0 degree to 90 degrees.

The inventor measured the communicatable range L with respect to different apex angles of the conical member 2204 of the prism 22. As a result, it was found that the lowest value of the communicatable range L was highest when the apex angle of the conical member 2204 was about 70 degrees. Therefore, the apex angle of the conical member 2204 should preferably be about 70 degrees.

Specifically, as shown in FIG. 9, when the apex angle of the conical member 2204 is 70 degrees, the communicatable range L keeps a lowest value of 7 m regardless of changes in the angle θ between the light beam and the hypothetical plane P. This lowest value of the communicatable range L is higher than the lowest value of the communicatable range of the conventional omnidirectional photodetector described above.

The reasons for the higher lowest value of the communicatable range L are as follows.

The prism of the conventional omnidirectional photodetector has an inverted conical recess defined in the upper surface of a columnar body and providing a reflecting surface for reflecting a light beam that is applied from a side surface of the prism. Therefore, the columnar body has a ridge fully around the outer circumferential edge of the upper surface thereof, i.e., along the boundary between the surface of the inverted conical recess and the side surface of the columnar body. When the light beam is applied to the ridge, the light beam is spread thereby, and cannot efficiently be guided to the light-detecting device.

According to the present embodiment, however, since no ridge is present on the conical member 2204 of the prism 22, the light is not spread by the conical member 2204 and hence can efficiently be guided to the light-detecting device 24.

According to the present invention, the conical surface 2206 of the conical member 2204 of the prism 22 provides a reflecting surface for reflecting a light beam applied from an external source to the conical surface 2206 into the columnar body 2202. Therefore, the light beam is efficiently guided to the light-detecting device 24 beneath the lower end of the columnar body 2202. The above arrangement according to the present invention is effective to keep a communicatable range for the infrared transmitter 10 which emits the infrared signal S to the omnidirectional photodetector 50.

If the apex angle of the conical member 2204 is 70 degrees, then the communicatable range L can have a large lowest value regardless of changes in the angle θ formed between the light beam applied to the conical member 2204 and the hypothetical plane P lying perpendicularly to the axis of the conical member 2204. This arrangement is more effective to keep a communicatable range for the infrared transmitter 10 which emits the infrared signal S to the omnidirectional photodetector 50.

In use, the infrared remote controller 8 operates as follows:

As shown in FIGS. 5 and 6, the infrared receiver 50 is mounted on the display unit 62 of the computer 60 by the attachment 80. The conical member 2204 is positioned above the display panel 62 and has its axis directed vertically.

When the operation keys 11 (see FIG. 1) of the infrared transmitter 10, to which operation commands are assigned, are operated, control data depending on the operated operation keys 11 is generated, and the light-emitting device 15 outputs an infrared signal S as a light beam corresponding to the control data.

Of the light beam emitted as the infrared signal S, a light beam applied to the conical surface 2206 of the prism 22 of the omnidirectional photodetector 20 passes through one of paths shown in FIGS. 7A through 7D and FIGS. 8A through 8D, and is emitted from the lower end of the columnar body 2202. The emitted light beam is converged by the condenser lens 26 onto the light-detecting device 24.

The light-detecting device 24 detects the light beam, generates a detected signal based on the detected light beam, and supplies the detected signal to the amplifying circuit 51. The detected signal is amplified by the amplifying circuit 51 and then decoded by the decoding circuit 52 into the control data. The control data from the decoding circuit 52 is supplied through the interface circuit 53 to the computer 60.

Based on the supplied control data, the computer 60 performs the page scrolling process, the blackout display process, or the whiteout display process.

With the infrared remote controller 8, the infrared transmitter 10 is operated to send an infrared signal to the infrared receiver 50 to supply control data to the computer 60 for thereby remotely controlling the projector 70 that is connected to the computer 60.

When infrared receiver 50 receives the infrared signal, it supplies control data to the computer 60 for thereby remotely controlling the projector 70 that is connected to the computer 60.

Since no dedicated units need to be incorporated in the projector 70 for remotely controlling the projector 70, existing projectors with no dedicated units can be remotely controlled. The remote control system according to the present invention is highly versatile and is effective to reduce costs required for remotely controlling the projector 70.

The interface circuit 53 of the infrared receiver 50 is connected to the computer 60 through a USB which is a general-purpose interface incorporated in most computers. As the infrared receiver 50 is not connected to the computer 60 through a serial interface, i.e., an input/output interface separate from general-purpose interfaces, for use with an input device such as a keyboard or a mouse of the computer 60, the infrared receiver 50 can be handled independently of the above input device. Consequently, the infrared receiver 50 may be located in a position where it can easily receive the infrared signal from the infrared transmitter 10, e.g., on an upper edge of the display unit 62 of the computer 60 or in a position spaced upwardly from the computer 60, for reliable operation of the infrared transmitter 10 and the infrared receiver 50.

In the above embodiment, the infrared signal is used as the wireless signal. However, an ultrasonic signal or an electromagnetic signal may be used as the wireless signal.

In the above embodiment, the electronic device that operated based on data supplied from the computer 60 is the projector 70. However, the electronic device is not limited to the projector 70, but may be anything which operates based on data supplied from the computer 60.

In the above embodiment, the control data is output from the interface circuit 53 to the computer 60 through the USB. However, the general-purpose interface interconnecting the interface circuit 53 and the computer 60 is not limited to the USB, but may be any of various known general-purpose interfaces such as a wired LAN, a wireless LAN, IEEE 1394, etc.

Although a certain preferred embodiment of the present invention has been shown and described in detail, it should be understood that various changes and modifications may be made therein without departing from the scope of the appended claims.

The invention claimed is:

1. A receiver, comprising:

a receiving unit to receive a wireless signal generated based on a data code converted from control data and to generate a detected signal;

decoding means for decoding the detected signal into the control data; and interface means connected to a computer for outputting the control data to the computer;

wherein the computer is connected to an electronic device that operates based on data supplied from the computer;

the computer supplies the data to the electronic device based on the control data supplied from the interface means, and the receiving unit includes a prism having a conical member.

2. The receiver according to claim 1, wherein the electronic device comprises a projector for displaying an image on a screen, the computer executes an application program installed therein to supply the projector with a video signal to display the image, and the control data represents a signal for controlling operation of the application program.

3. The receiver according to claim 2, wherein the application program enables the computer to control the projector to display images on the screen one by one in a slide show mode, and the control data comprises control data for enabling the computer to perform one or both of a process of displaying images page by page on the screen and a process of displaying a uniformly black image on the screen or a process of displaying a uniformly white image on the screen.

4. The receiver according to claim 1, wherein the wireless signal comprises an infrared signal.

5. The receiver according to claim 1, wherein the wireless signal comprises an infrared signal, and the wireless signal is transmitted by modulating the infrared signal which is turned on and off at a predetermined carrier frequency, with binary data expressed by a combination of 0s and 1s.

6. The receiver according to claim 1, wherein the interface means outputs the control data through a general-purpose interface of the computer which is separate from an interface for use with an input device of the computer.

7. The receiver according to claim 6, wherein the general-purpose interface comprises a USB (Universal Serial Bus).

* * * * *